(No Model.)
W. N. GREER.
FISH TRAP HOOK.
No. 280,610. Patented July 3, 1883.
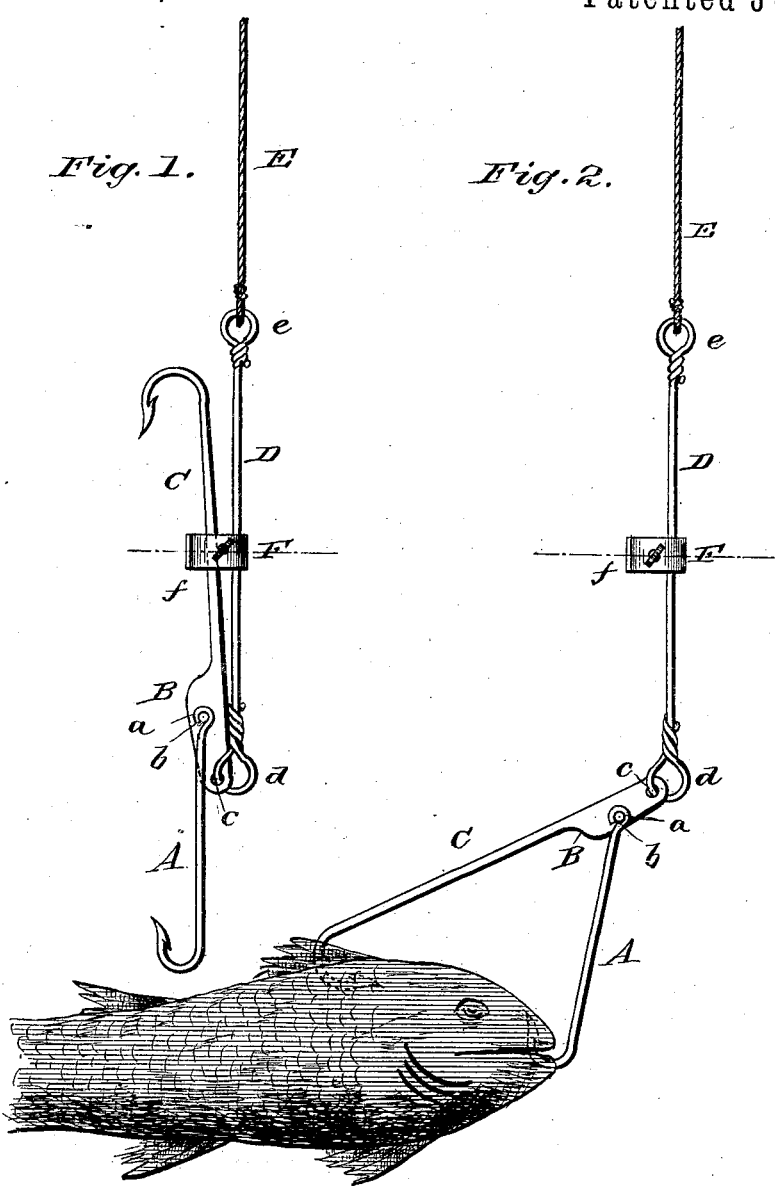

UNITED STATES PATENT OFFICE.

WILLIAM N. GREER, OF WATERTOWN, DAKOTA TERRITORY.

FISH TRAP-HOOK.

SPECIFICATION forming part of Letters Patent No. 280,610, dated July 3, 1883.

Application filed April 2, 1883. (No model.)

*To all whom it may concern:*

Be it known that I, WILLIAM N. GREER, of Watertown, in the county of Codington and Territory of Dakota, have invented certain new and useful Improvements in Fish-Hooks; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of the device, showing it "set." Fig. 2 is a similar view, showing the hook "sprung;" and Fig. 3 is a cross-section of the spring-clamp on an enlarged scale.

Similar letters of reference indicate corresponding parts in all the figures.

My invention has relation to that class of fish-hooks generally known as "lever-hooks," and more particularly to that class of lever-hooks in which the catch-hook is held by means of a clamp; and it consists in the detailed construction of the said clamp and its combination with other parts $s$ of the hook, as hereinafter more fully described and claimed. In using this class of hooks it is desirable to be able to set the catch-hook so that it will be released and strike the fish biting on the bait-hook, while it is at the same time desirable to have the catch-hook set in such a manner that it will not strike the fish which may only be nibbling at the bait; and to accomplish this end I construct the clamp in such a manner that it may clamp the catch-hook farther from or closer to the fulcrum of the latter, according to the nature and manner of biting of the fish for which the bait is set, more force being required to release the catch-hook when it is clamped far from the fulcrum than when it is clamped near to it.

In the accompanying drawings, A denotes the bait-hook, the shank of which is pivoted by its eye $a$ upon a pin or stud affixed upon the enlarged lower end, B, of the upper hook, C, said pivoting-stud being shown at $b$. The enlarged end of hook C has an eye, $c$, by which it is attached to the eye or loop $d$ of a slender rod or wire, D, the other end of which has another loop or eye, $e$, to which the fish-line shown at E is fastened.

The spring slide or catch F consists of a strip of spring metal forming an eye, F', at its inner doubled end, which slides upon rod D. The ends are held together by a small set-screw, G, while its outer ends form wings $f$, which clasp the shank of the hook C, when inserted, in such a manner that by a slight pull it may be drawn out of the said clamp. It will also be seen that the clamp may be adjusted upon rod B by loosening the screw, sliding the clamp, and securing it where it is desired by tightening the screw again.

From the foregoing description, taken in connection with the drawings, the operation of this device will readily be understood without requiring further elucidation. As the fish takes the bait and pulls upon the bait-hook A, this, in turn pulling upon the enlargement B of the upper hook, C, will tilt this upon its fulcrum in the eye $d$, so as to release it from the spring-clamp F on rod D, thereby, by the leverage between the points $b$ and $d$, throwing the upper hook downward with considerable force, causing its barbed point to penetrate the body of the fish caught on the bait-hook, so that it will be impossible for the catch to escape.

Having thus described my invention, I claim and desire to secure by Letters Patent of the United States—

The combination, in a fish-hook of the described class, of the spring-clamp F, forming eye F', and clamping-wings $f$, having set-screws G and sliding adjustably upon rod D, with the catch-hook C, hinged to the end of rod D, and having bait-hook A, hinged near its fulcrum, as and for the purpose shown and set forth.

In testimony that I claim the foregoing as my own I have hereunto affixed my signature in presence of two witnesses.

WILLIAM N. GREER.

Witnesses:
C. X. SEWARD,
W. H. DONALDSON.